T. E. GORDON.
CRUTCH.

No. 45,242. Patented Nov. 29, 1864.

Witnesses:
J. Holmes
A. W. McClellan

Inventor:
T. E. Gordon

UNITED STATES PATENT OFFICE.

THOMAS E. GORDON, OF CLEVELAND, OHIO.

IMPROVEMENT IN CRUTCHES.

Specification forming part of Letters Patent No. 45,242, dated November 29, 1864.

*To all whom it may concern:*

Be it known that I, THOMAS E. GORDON, of Cleveland, in the county Cuyahoga and State of Ohio, have invented certain new and useful Improvements in Crutches; and I do hereby declare that the following is a full and complete description of the construction and operation of the same, reference being had to the accompanying drawings, making a part of this specification, in which—

Figure 1:
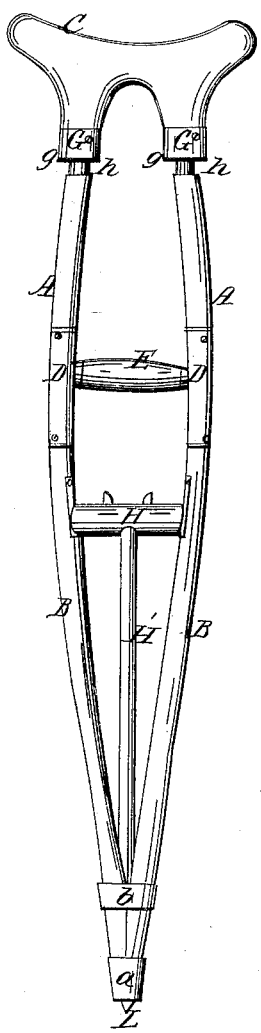
Figure 2:
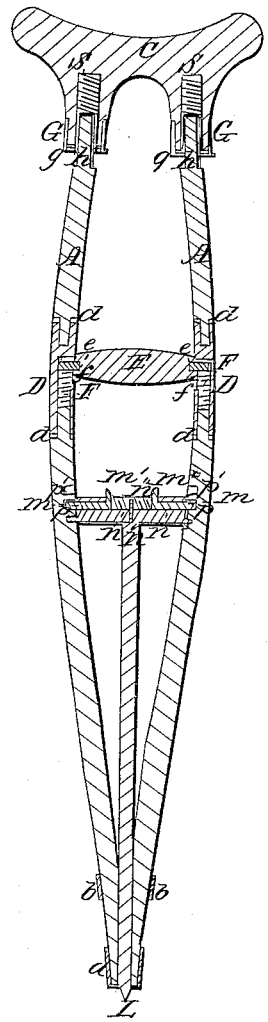

Figure 1 represents the crutch, of which Fig. 2 is a vertical section.

Like letters of reference refer to like parts in the two views.

My improvement relates to a certain arrangement of springs, in connection with a crutch, so as to render it easy for use, and also to the means used for making it various lengths, and to the mode of preventing it from slipping.

The side rods of the crutch, formed of two sections, A and B, enter the head C at the top, and come together at the lower end to a point, around which is a ferrule, $a$, and a short distance above there is another ferrule, $b$. The upper and lower sections, A and B, of the side rods, are connected by the ferrules D, a stem of each section fitting into the ferrule, as represented in Fig. 2, and secured by a screw. Around each stem is a washer, $d$, by means of which the crutch can be lengthened or shortened, by inserting or removing them, and there can be one or more washers on each stem, as may be required to make the crutch the desired length.

E is a hand-piece between the side rods, at a suitable distance from the head C, the ends $e$ of which rest on springs F in the ferrule, there being slotted openings $f$ for the ends to move in.

The upper ends of the sections A extend into the head C, which is of a suitable shape at the top, and extends down in two parts, around the lower ends of which are ferrules G, with a rim, $g$, underneath, that fits around the ends of the sections A, which are also covered with caps or ferrules $h$, as represented. Above these ends, in chambers in the head, are springs S, that rest on the top of the sections, and when there is pressure or weight on the head it moves down on the ends of the sections, thus giving spring and elasticity to the movement of the head, and the hand-piece E is rendered equally elastic by the springs F, arranged as described.

Between the side rods B B is a cross-piece, H, from the center of which extends down a stem or rod, H', forming a point, L, at the lower end, below the ferrule $a$. This point can be adjusted above or below the ferrule by devices in the cross-bar H that connect it to the side pieces, consisting of catches $m$, which are retained in holes $p$ by the springs $n$, there being a division, $n'$, between the springs, and a slotted opening, $n''$, in the top.

When it is desired to raise the point at any time, clasp the catches $m$ by the projections $m'$, removing the catches from the openings $p$, and elevate the cross-bar until the catches will spring into the holes $p'$.

The object of the point L is that the crutch may be used with greater facility in passing over uneven surfaces, and when out of doors; but it would not be desirable in the house, as it would be liable to indent the floor and injure carpets.

The point can easily be elevated, when desired, by reaching down the hand that is over the crutch, and removing the catches, as before described.

From the arrangement of the springs in this crutch it will yield or give easily to any inclination or position of the body, and it can be constructed in a neat and well-proportioned form, its length at any time increased or diminished, and it can readily be adjusted for out or in door use.

What I claim as my improvement, and desire to secure by Letters Patent, is—

1. The arrangement of the springs S S and ferrules G G, in combination with the head C and sectional side rods, A A and B B, as and for the purpose set forth.

2. The springs F F, ferrules D D, and washers $d$ $d$, in combination with the hand-piece E and sectional side rods, A A and B B, as and for the purpose described.

3. The springs $n$ $n$ and catches $m$ $m$, in combination with the cross-piece H, rod H', and sections B B, as and for the purpose set forth.

T. E. GORDON.

Witnesses:
   J. LEONARD,
   A. W. McCLELLAND.